(12) United States Patent
Landry

(10) Patent No.: US 8,508,481 B1
(45) Date of Patent: Aug. 13, 2013

(54) ADAPTIVE TOUCH KEYBOARD

(75) Inventor: Shane Jeremy Landry, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 503 days.

(21) Appl. No.: 12/828,523

(22) Filed: Jul. 1, 2010

(51) Int. Cl.
*G06F 3/02* (2006.01)

(52) U.S. Cl.
USPC .......................................... 345/168; 345/173

(58) Field of Classification Search
USPC .................. 345/168, 171, 173, 169; 455/566
See application file for complete search history.

(56) References Cited

U.S. PATENT DOCUMENTS

| | | | | |
|---|---|---|---|---|
| 6,307,541 B1 * | 10/2001 | Ho et al. | | 345/171 |
| 6,405,060 B1 * | 6/2002 | Schroeder et al. | | 455/566 |
| 6,724,370 B2 * | 4/2004 | Dutta et al. | | 345/169 |
| 7,194,239 B2 * | 3/2007 | Mantyjarvi et al. | | 455/66.1 |
| 7,401,300 B2 | 7/2008 | Nurmi | | |
| 2007/0075978 A1 | 4/2007 | Chung | | |
| 2007/0152980 A1 | 7/2007 | Kocienda et al. | | |

\* cited by examiner

*Primary Examiner* — Quan-Zhen Wang
*Assistant Examiner* — Yuk Chow

(57) ABSTRACT

A method, system, and medium are provided for improving the accuracy of keystroke detection by determining what finger position a person is using to type. The finger, or fingers, used to contact the keys may define a finger position. Once the finger position is detected, hot spots for individual keys may be positioned according to a profile associated with the finger position. The hot spot is the portion of the touch screen that needs to be contacted in order to register a keystroke for the associated key. Each key has its own hot spot. The hot spot for a key may change without the display of the key on the touch-screen keyboard changing.

17 Claims, 8 Drawing Sheets

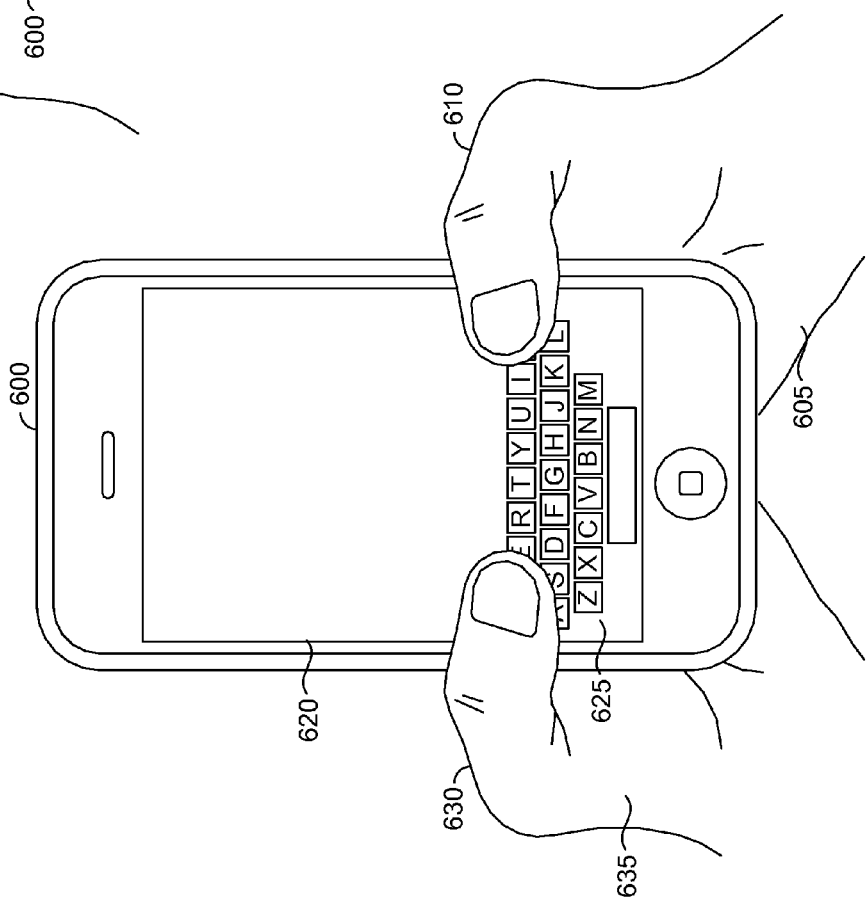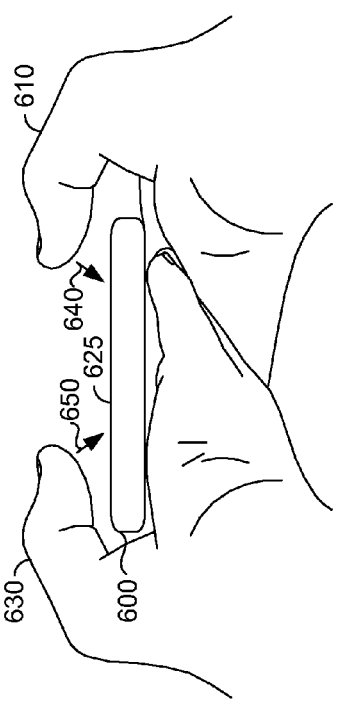

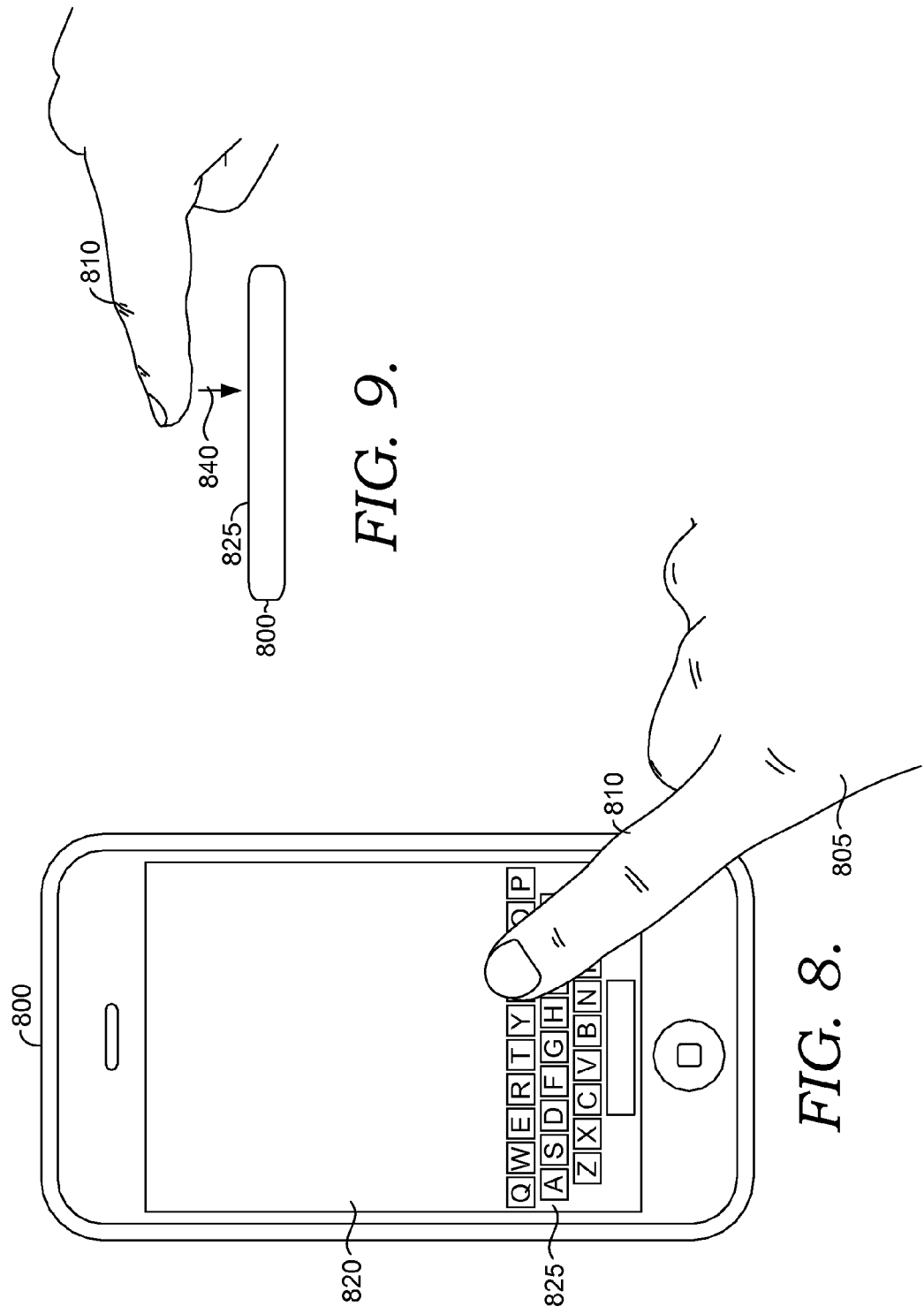

ADAPTIVE TOUCH KEYBOARD

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative aspect, a way of improving keystroke detection on a touch-screen keyboard is provided. The way includes determining a user's finger position by analyzing contact characteristics of at least one keystroke made on the touch-screen keyboard. The contact characteristics describe a finger's contact with the touch screen made during the keystroke. The way includes positioning a touch-screen keyboard's key hotspots based on the user's finger position, wherein a key hotspot is an area on the touch screen, contact with which is interpreted as selecting a corresponding key on the touch-screen keyboard.

In another aspect, ways of adjusting key hotspots based on a finger-position profile is provided. The way includes displaying a touch-screen keyboard on a touch screen and receiving a first keystroke through the touch-screen keyboard, wherein the first keystroke has contact characteristics. The way includes determining that the contact characteristics are consistent with one or more finger positions. The way also includes selecting a presumptive finger position that corresponds to one of the one or more finger positions. The way further includes positioning a touch-screen keyboard's key hotspots to fit a usage pattern within a finger-position profile that corresponds to the presumptive finger position.

In a third aspect, a way of positioning key hotspot locations based on an active finger-position profile is provided. The way includes displaying a touch-screen keyboard on a touch screen. The way includes receiving a first keystroke on a right side of the touch-screen keyboard. The first keystroke has a first set of contact characteristics. The way also includes receiving a second keystroke on a left side of the touch-screen keyboard. The second keystroke has a second set of contact characteristics. The way includes determining that the first set of contact characteristics and the second set of contact characteristics indicate that a user is addressing the touch-screen keyboard using a first finger position. The way further includes building a finger-position profile that corresponds to the first finger position. The finger-position profile describes a user's pattern of key interaction when the user is interacting with the touch screen with a particular finger position corresponding to the finger-position profile.

BRIEF DESCRIPTION OF THE SEVERAL VIEWS OF THE DRAWINGS

Illustrative embodiments of the present invention are described in detail below with reference to the included drawing figures, wherein:

FIG. 6 is a diagram illustrating a top view of a both-thumb finger position, according to an embodiment of the present invention;

FIG. 7 is a diagram illustrating a side view of a both-thumb finger position, according to an embodiment of the present invention;

FIG. 8 is a diagram illustrating a top view of an index-finger finger position, according to an embodiment of the present invention;

FIG. 9 is a diagram illustrating a side view of an index-finger finger position, according to an embodiment of the present invention;

DETAILED DESCRIPTION

Embodiments of the present invention will be better understood from the detailed description provided below and from the accompanying drawings of various embodiments of the invention. Embodiments to the present invention relate generally to improving the accuracy of a touch-screen keyboard. A touch-screen keyboard is a keyboard presented on a touch screen. The touch screen may be on a mobile device, smart phone, tablet PC, laptop PC, or other device.

Embodiments to the present invention improve the accuracy of keystroke detection by determining what finger position a person is using to type. The finger, or fingers, used to contact the keys may define a finger position. As used throughout this disclosure, a thumb is a type of finger. For example, contacting the keyboard with only a right thumb and a left thumb is a finger position. Similarly, contacting the keyboard with only the left thumb is a different finger position. Once the finger position is detected, hot spots for individual keys may be positioned according to a profile associated with the finger position. The profile records a user's keystroke characteristics when they are using a particular finger position and establishes a pattern of contact points on the keyboard. For example, the pattern may indicate that the user strikes the left portion of the "E" key. In this case, the hot spot for the "E" key may be moved to the left and may even be underneath part of the right portion of the "W" key. The hot spot is the portion of the touch screen that needs to be contacted in order to register a keystroke for the associated key. Each key has its own hot spot. In one embodiment, the hot spot for a key may change without the display of the touch-screen keyboard changing. In other words, the hot spot would move, but the key would remain in the same location on the screen.

Embodiments of the present invention may take the form of a method, system, or computer-readable media with computer-executable instructions embodied thereon. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
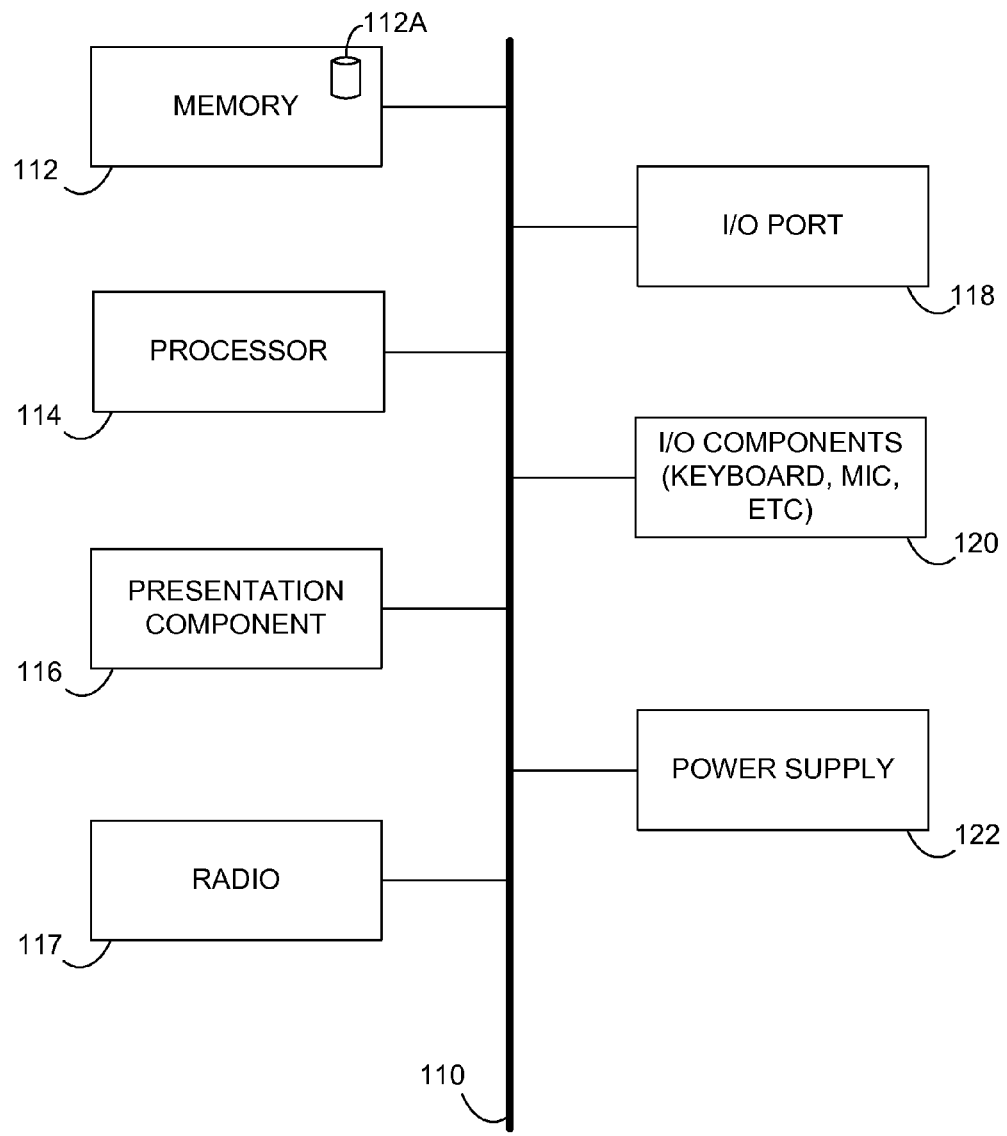
FIG. 1 is a block diagram of an illustrative mobile computing device in which an embodiment of the present invention operates.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
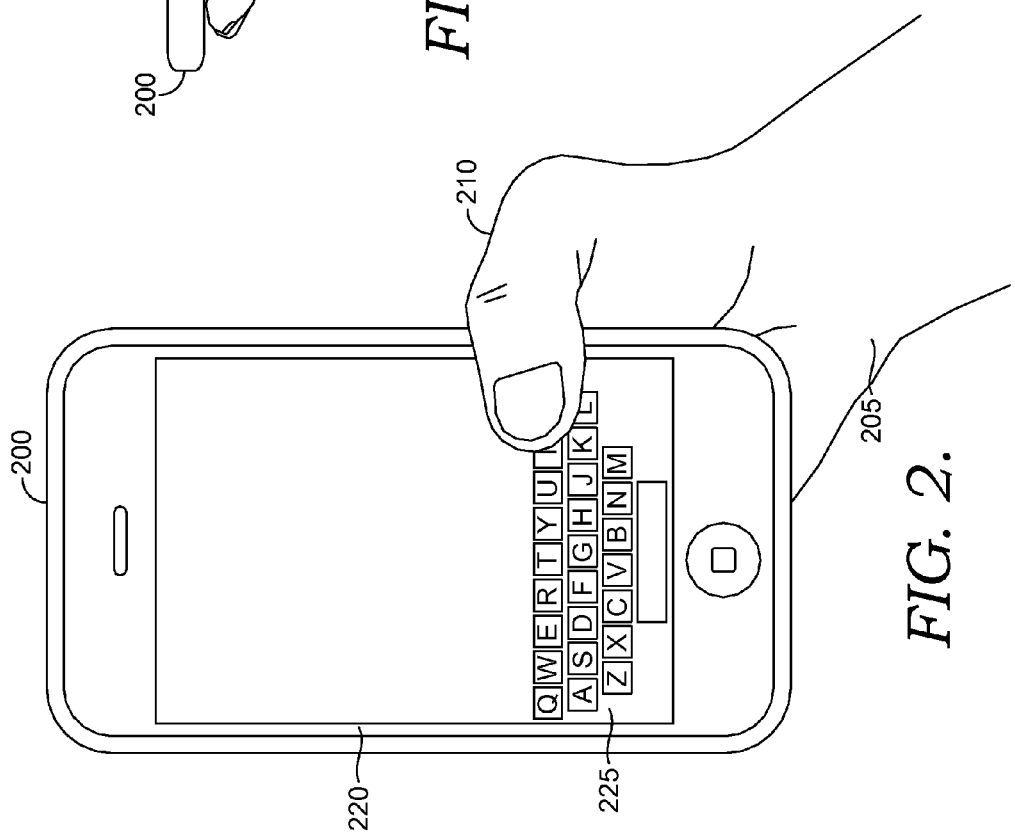
FIG. 2 is a diagram illustrating a top view of a right-thumb finger position, according to an embodiment of the present invention.

FIGS. 2-9 illustrate different finger positions and keystroke characteristics associated with the finger positions. Turning now to FIG. 2, a right-thumb finger position is illustrated, according to an embodiment of the present invention. In FIG. 2, the user is holding a mobile device 200 in their right hand 205. The mobile device 200 may be similar to mobile device 100 described previously with reference to FIG. 1. The mobile device 200 includes a touch screen 220 that is displaying a touch-screen keyboard 225. In the right-thumb finger position, the user contacts the touch-screen keyboard 225 using only the right-thumb 210. Touch-screen keyboard 225 is a QWERTY keyboard. Embodiments to the present invention are not limited to using a QWERTY keyboard. In the right-thumb finger position, the user would use the right-thumb 210 to contact any key on the touch-screen keyboard 225.

Figure 3:
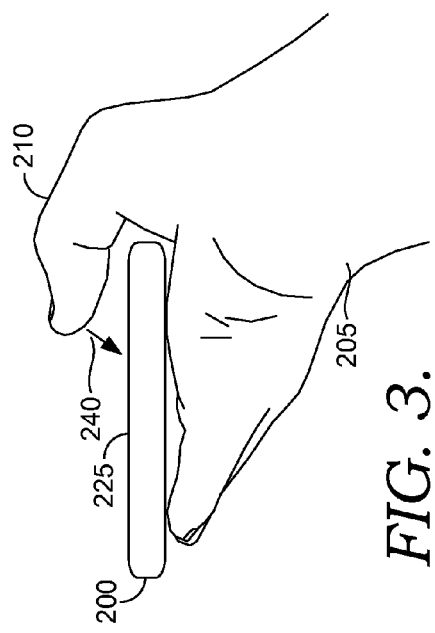
FIG. 3 is a diagram illustrating a side view of a right-thumb finger position, according to an embodiment of the present invention.

Turning now to FIG. 3, a side view of the right-thumb finger position is shown, in accordance with an embodiment of the present invention. The side view shows that a person using the right-thumb finger position may produce a keystroke with a right-to-left angle, as shown by arrow 240. The angle may differ on a key-by-key basis. Some users may consistently strike keys from a right-to-left angle when using the right-thumb finger position. In general, keystrokes made on keys on the right side of the keyboard may be closer to vertical and keystrokes on the left side of the keyboard may be at a more acute right-to-left angle. The particular angle shown in FIG. 3 is for the sake of illustration to demonstrate a keystroke characteristic that may be used to identify a user's finger position.

Figure 4:
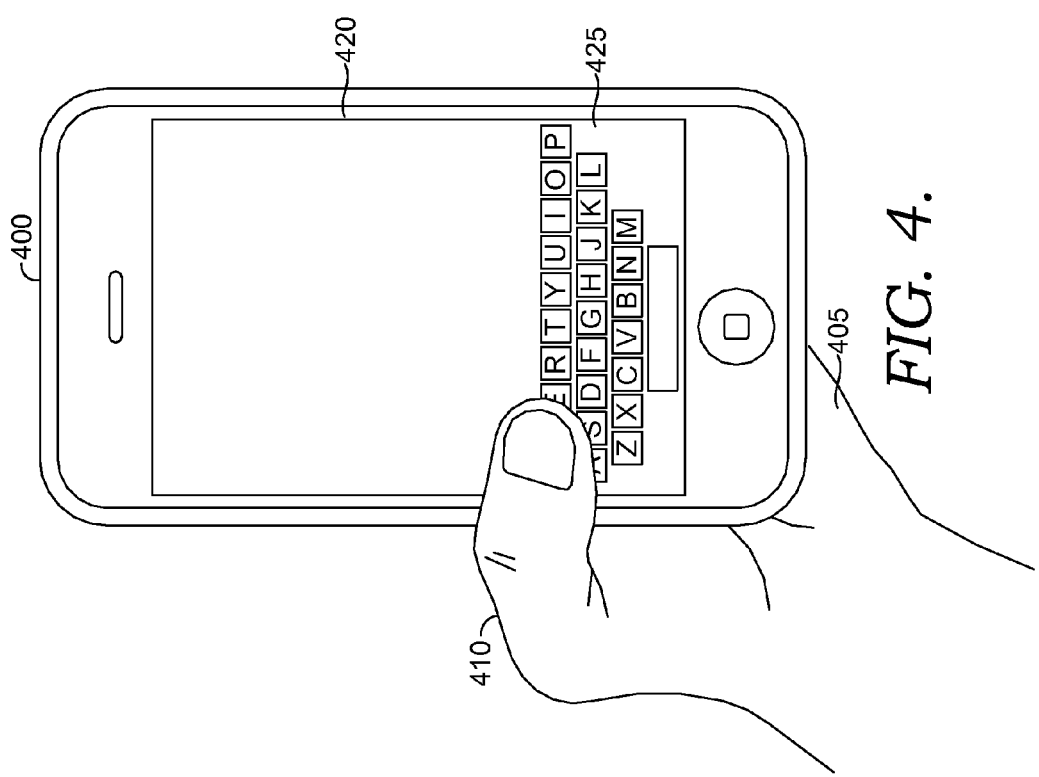
FIG. 4 is a diagram illustrating a top view of a left-thumb finger position, according to an embodiment of the present invention.

Turning now to FIG. 4, a diagram illustrating a top view of a left-thumb finger position is shown, according to an embodiment of the present invention. In FIG. 4, the user is holding the mobile device 400 with their left hand 405. The mobile device includes a touch screen 420. A touch-screen keyboard 425 is displayed on the touch screen 420. The user is typing on the touch-screen keyboard 425 with only their left thumb 410. In the left-thumb finger position, the user interacts with all keys on the touch-screen keyboard 425 using only their left hand thumb.

Figure 5:
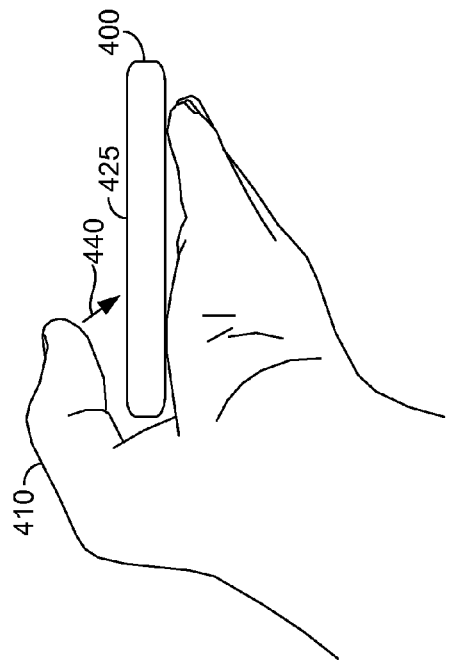
FIG. 5 is a diagram illustrating a side view of a left-thumb finger position, according to an embodiment of the present invention.

Turning now to FIG. 5 a side view of a left-thumb finger position is shown, according to the embodiment of the present invention. As can be seen, the user may contact or approach the touch screen from a left-to-right angle, as illustrated by arrow 440. The angle of contact 440 may be used to identify which finger position the user is currently typing with. Other characteristics such as the size of the contact area or the shape of the contact area may also be used to determine what finger position the user is in. For example, the thumb may leave a different shape contact area than an index finger. In addition, the right thumb or left thumb may have a similar size and shape contact area but the contact area may have a different orientation. Thus, the contact area's orientation is another characteristic that may be used to identify the finger position.

Turning now to FIG. 6, a diagram illustrating a top view of a both-thumb finger position is shown, according to an embodiment of the present invention. In FIG. 6, the user is holding the mobile device 600 with both their right hand 605 and their left hand 635. The mobile device 600 includes a touch screen 620 that is displaying a touch-screen keyboard 625. The touch-screen keyboard 625 is a QWERTY keyboard, but embodiments of the invention are not limited to use with a QWERTY keyboard. The both-thumb finger position is characterized by the user interacting with the keyboard, or making keystrokes, with both their right-thumb 610 and their left thumb 630. In general, the user may use their right-thumb to contact keys on the right side of the keyboard and their left thumb 630 to contact keys on the left side of the keyboard. Embodiments to the present invention are not limited to dividing the keyboard in the middle, only that the both-thumb finger position is characterized by the user contacting the keyboard with both thumbs.

Turning now to FIG. 7, a side view of the both-thumb finger position is shown, according to an embodiment of the present invention. As can be seen, the right-thumb 610 will produce keystrokes from a right-to-left direction. The angle of contact 640 is different than the angle of contact 650 produced by the left thumb 630 when making a keystroke. Thus, the both-thumb finger position may be identified by keystrokes occurring at approximately opposite contact angles. In addition, the keystrokes on the right side of the keyboard may be struck with a different contact angle than keys on the left side of the keyboard. The shape, size, and orientation of the contact area on the right or left side of the keyboard may differ, further indicating that opposite thumbs are being used to produce keystrokes on the touch-screen keyboard 625.

Turning now to FIG. 8, a top view of an index-finger finger position is shown, in accordance with an embodiment of the present invention. In FIG. 8, the mobile device 800 includes a touch screen 820, which is displaying a touch-screen keyboard 825. The user is interacting with the touch-screen keyboard using the index finger 810 on their right hand 805. The user may be holding the mobile device 800 with their left hand. The mobile device 800 could be resting on a surface.

Turning now to FIG. 9, a side view of an index-finger finger position is shown, according to an embodiment of the present invention. As can be seen, in the index-finger finger position, the angle of contact 840 is more or less perpendicular to the surface of the touch-screen keyboard 825. As stated previously, the angle of contact 840 may be used to help determine the finger position that a user is typing with.

Embodiments to the present invention are not limited to the four finger positions shown in FIGS. 2-9. Other finger positions include both index fingers, various combinations of thumbs and index fingers, various combinations of other fingers, and a traditional ten-finger finger position used on standard keyboards.

Figures 10, 11:
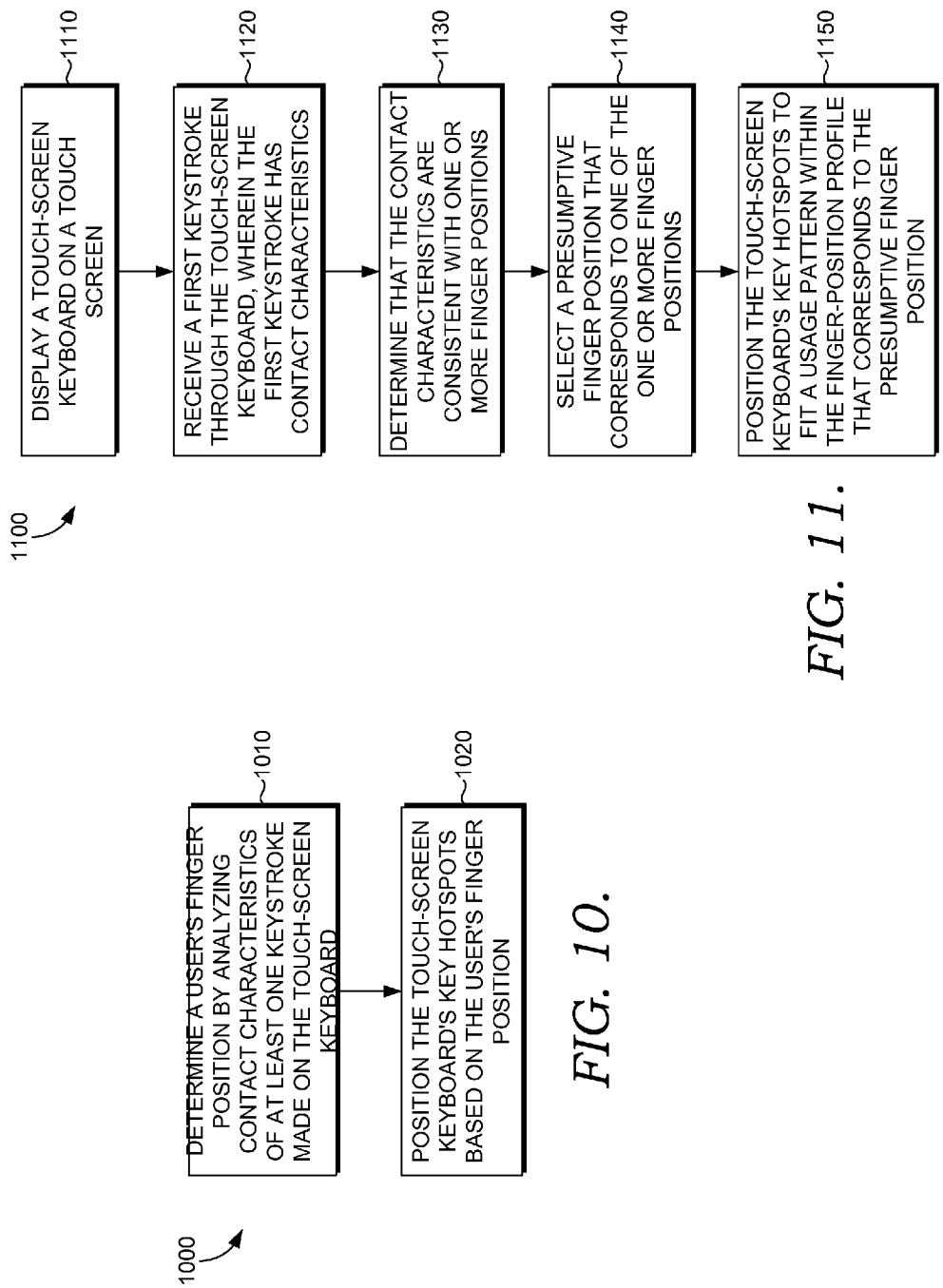
FIG. 10 is a flow diagram of a method that improves keystroke detection on a touch-screen keyboard, according to an embodiment of the present invention.
FIG. 11 is a flow diagram of a method of positioning key hotspots based on a finger-position profile, according to an embodiment of the present invention.

Turning now to FIG. 10, a method that improves keystroke detection on a touch-screen keyboard is shown, according to an embodiment of the present invention. The touch-screen keyboard may be displayed on a mobile device, tablet PC, reading device, or other device. The touch screen may be a capacitive touch screen, a resistive touch screen, a combination touch screen, or other touch screen. The touch-screen keyboard may be a QWERTY keyboard, number pad, or other keyboard style.

At step 1010, a user's finger position is detected by analyzing contact characteristics of at least one keystroke made on a touch-screen keyboard. A keystroke is a contact with the touch screen at a location above, or approximately above, where a particular key is displayed on the touch screen. Various examples of finger positions have been illustrated previously and include a right-thumb finger position, a left-thumb finger position, a both-thumb finger position, an index-finger finger position, a dual-finger finger position, a 10-finger finger position, a 4-finger finger position, and others. The contact characteristics include the size of the contact area on the touch screen, the shape of the contact area on the touch screen, the orientation of the contact area on the touch screen, the amount of pressure applied during the contact, the angle of contact, and others.

In one embodiment, the finger position is determined by comparing the contact characteristics of at least one keystroke with a finger-position profile. The finger-position profile is a record of a user's pattern of contact when typing on the touch-screen keyboard using a corresponding finger position. In one embodiment, each finger position has a different finger-position profile. Initially, a computing device with a touch screen may have default finger-position profiles for a number of different finger positions. The default profile may contain typical contact characteristics to help identify various finger positions. As a finger position is identified, the usage pattern within the default finger-position profile changes to reflect an actual user's tendencies while typing in the corresponding finger position.

Figure 13:
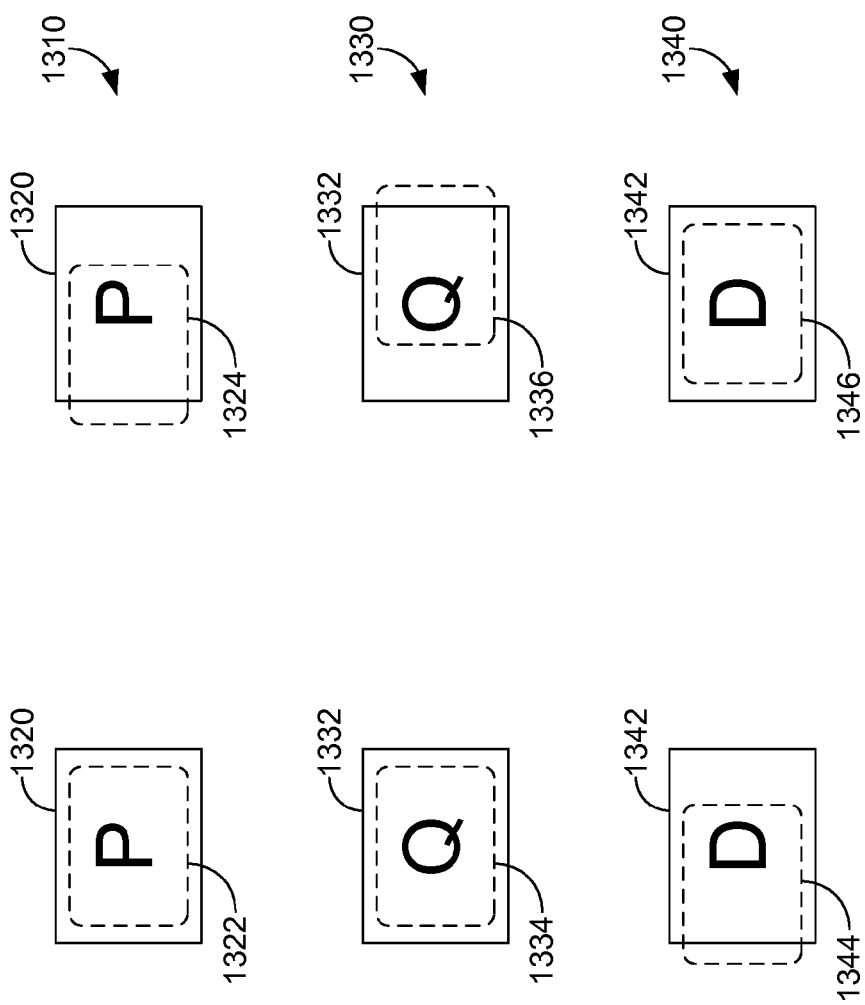
FIG. 13 is a diagram illustrating key hotspot positioning, in accordance with an embodiment of the present invention.

At step 1020, the touch-screen keyboard's key hotspots are positioned based on the user's finger position. The key hotspot is an area on the touch screen where contact is interpreted as intending to contact a particular key on the keyboard associated with the hotspot. An actual contact or keystroke may contact portions of several hotspots. The program operating the touch-screen keyboard may interpret the contact to determine which key is the intended key. Moving the hotspots to more closely reflect a user's intention, improves the accuracy of the touch-screen keyboard. FIG. 13 gives several examples of positioning hotspots.

Turning now to FIG. 13, key hotspot locations are illustrated according to an embodiment of the present invention. Hotspot positioning example 1310 is an example of positioning the hotspot to the left of where the key is displayed on the mobile device. Initially, the hotspot 1322 is displayed directly beneath the "P" key 1320. This may represent a default setting for the "P" key 1320. As can be seen, hotspot 1324 is to the left of where the "P" key 1320 is displayed. The hotspot may be moved to the left when the user's pattern of contact indicates that a keystroke on the "P" key 1320 will be to the left portion of the key 1320.

Example 1330 illustrates moving the hotspot to the right. The initial hotspot 1334 is directly beneath the "Q" key 1332. Upon determining that the user is in a particular finger position where they strike the right half of the "Q" key 1332, the hotspot 1336 may be moved to the right.

Example 1340 illustrates moving a key hotspot from an off-center position back to a center position. Initially, the hotspot 1344 under the "D" key 1342 is to the left. Upon detecting a different finger position, the hotspot 1346 may be moved directly beneath the "D" key 1342. In one embodiment, as the user changes finger positions, perhaps from using the right hand to the left hand or from using one hand to both hands, the key hotspots are dynamically repositioned in accordance with the finger-position profile associated with the current finger position.

Turning now to FIG. 11, a method of adjusting key hotspots based on a finger-position profile is shown, in accordance with an embodiment of the present invention. At step 1110, a touch-screen keyboard is displayed on a touch screen. The touch screen may be associated with a computing device such as a smart phone, PDA, tablet PC, reading device, or other device. The touch screen may be in color or black and white.

At step 1120, a first keystroke is received through the touch screen keyboard. The first keystroke has contact characteristics. Examples of contact characteristics associated with a keystroke have been described previously. At step 1130, the contact characteristics are determined to be consistent with one or more finger positions. A single keystroke may not be enough to differentiate between all of the available finger positions. The single keystroke may be consistent with several finger positions. For example, a keystroke with characteristics consistent with a right-thumb touching the "P" key, which is on the right side of the keyboard may be consistent with both the right-thumb only position and the both-thumb finger position.

At step 1140, a presumptive finger position is selected from the one or more finger positions. In one embodiment, the most commonly used finger position, among the one or more finger positions that are consistent with the contact characteristics of the first keystroke is selected. For example, if a particular person uses the right-thumb only finger position more frequently than the both-thumb finger position then the right-thumb finger position may be selected as the presumptive finger position.

At step 1150, the touch-screen keyboard's key hotspots are positioned to fit a usage pattern consistent with the finger-position profile that corresponds to the presumptive finger position. The finger-position profile describes a user's pattern of key interaction with the touch-screen keyboard using a particular finger position. The user's pattern of key interaction indicates where on the touch screen the user touches when the user intends to select a key on the touch-screen keyboard.

Upon receiving additional keystrokes with additional contact characteristics, the active finger-position profile may be confirmed or changed. In one embodiment, when a second keystroke has contact characteristics that are not consistent with the presumptive finger position, but are consistent with a different finger position within the one or more finger positions, then a second finger position that is consistent with both of the keystrokes is made the active finger position. Upon changing the active finger position, the touch-screen keyboard's key hotspots are repositioned based on the active finger-position profile that corresponds to the active finger position.

Figure 12:
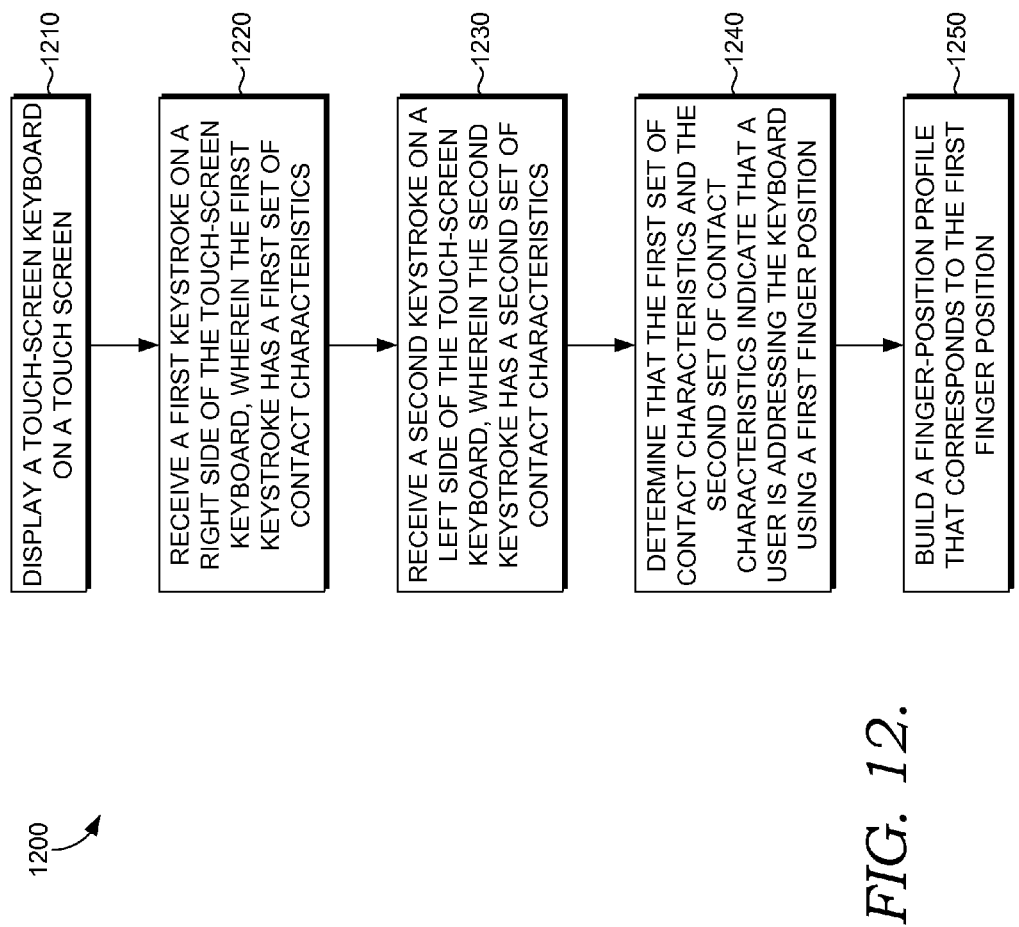
FIG. 12 is a flow diagram of a method of positioning key hotspot locations based on an active finger-position profile, according to an embodiment of the present invention.

Turning now to FIG. 12, a method of positioning key hotspot locations based on an active finger-position profile is shown, in accordance with an embodiment of the present invention. At step 1210, a touch-screen keyboard is displayed on a touch screen. The touch-screen keyboard may be a QWERTY keyboard. At step 1220, a first keystroke is received on a right side of the touch-screen keyboard. The first keystroke has a first set of contact characteristics. At step 1230, a second keystroke is received on a left side of the touch-screen keyboard. The second keystroke has a second set of contact characteristics.

At step 1240, the first set of contact characteristics and a second set of contact characteristics are determined to indicate that a user is addressing the keyboard using a first finger position. The user's finger position may be determined by matching the contact characteristics of the first and second keystroke with contact characteristics that are consistent with the first finger position.

At step 1250, a finger-position profile is built that corresponds to the first finger position. The finger-position profile describes a user's pattern of key interaction when the user is interacting with the touch screen. The finger-position profile may be used to position key hotspots in such a way that the accuracy of the keystrokes improves. The positioning of key hotspots has been described previously with reference to FIG. 13. The finger-position profile may also be used to determine the user's finger position in the future.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method that improves keystroke detection on a touch-screen keyboard, the method comprising:
   determining a user's finger position by analyzing contact characteristics of at least one keystroke made on the touch-screen keyboard, wherein the contact characteristics describe a finger's contact with the touch screen made during the keystroke;
   positioning a touch-screen keyboard's key hotspots based on the user's finger position, wherein a key hotspot is an area on the touch screen, contact with which is interpreted as selecting a corresponding key on the touch-screen keyboard; and
   wherein the user's finger position comprises one of touching the touch-screen keyboard with only a right-hand thumb, touching the touch-screen keyboard with only a left-hand thumb, touching the touch-screen keyboard with both the right-hand thumb and the left-hand thumb, touching the touch-screen keyboard with one finger, and touching the touch-screen keyboard with one right-hand finger and one left-hand finger.

2. The method of claim 1, wherein the touch-screen keyboard's key hotspots are positioned to fit a usage pattern within a finger-position profile that corresponds with the user's finger position.

3. The method of claim 1, wherein the method further comprises:
   determining that a user has changed to a different finger position on the touch-screen keyboard by analyzing contact characteristics of one or more additional keystrokes; and
   repositioning the touch-screen keyboard's key hotspots to fit a usage pattern within a finger-position profile that corresponds with a user's different finger position.

4. The method of claim 1, wherein the contact characteristics comprise one or more of an angle of contact and a size of an area of the touch-screen keyboard contacted during a keystroke.

5. The method of claim 4, wherein the contact characteristics further comprise a shape of the area of the touch-screen keyboard contacted during the keystroke.

6. The method of claim 1, wherein positions of the key hotspots change without changing an appearance of keys displayed on the touch-screen keyboard.

7. One or more non-transitory computer-readable media having computer-executable instructions embodied thereon that when executed by a computing device perform a method of adjusting key hotspots based on a finger-position profile, the method comprising:
   displaying a touch-screen keyboard on a touch screen;
   receiving a first keystroke through the touch-screen keyboard, wherein the first keystroke has contact characteristics;
   determining that the contact characteristics are consistent with one or more finger positions;
   selecting a presumptive finger position that corresponds to one of the one or more finger positions;
   positioning a touch-screen keyboard's key hotspots to fit a usage pattern within a finger-position profile that corresponds to the presumptive finger position; and
   wherein the presumptive finger position comprises one of interacting with only a right-hand thumb, interacting with only a left-hand thumb, interacting with both the right-hand thumb and the left-hand thumb, interacting with one finger, interacting with one right-hand finger and one left-hand finger.

8. The media of claim 7, wherein the finger-position profile describes a user's pattern of key interaction when a user is interacting with the touch-screen keyboard with a particular finger position corresponding to the finger-position profile.

9. The media of claim 8, wherein the user's pattern of key interaction indicates where on the touch screen the user touches when the user intends to select a key on the touch-screen keyboard.

10. The media of claim 8, wherein the presumptive finger position is selected because a user profile indicates that the presumptive finger position is used more often than other finger positions in the one or more finger positions.

11. The media of claim 9, wherein the method further comprises:
   receiving a second keystroke with contact characteristics that are not consistent with the presumptive finger position, but are consistent with a different finger position within the one or more finger positions; and
   repositioning the touch-screen keyboard's key hotspots based on the finger-position profile that corresponds to the different finger position.

12. The method of claim 7, wherein the touch screen is a capacitive screen.

13. One or more non-transitory computer-readable media having computer-executable instructions embodied thereon that when executed by a computing device perform a method of positioning key hotspot locations based on an active finger-position profile, the method comprising:
   displaying a touch-screen keyboard on a touch screen;
   receiving a first keystroke on a right side of the touch-screen keyboard, wherein the first keystroke has a first set of contact characteristics;
   receiving a second keystroke on a left side of the touch-screen keyboard, wherein the second keystroke has a second set of contact characteristics;
   determining that the first set of contact characteristics and the second set of contact characteristics indicate that a user is addressing the touch-screen keyboard using a first finger position;
   building a finger-position profile that corresponds to the first finger position, wherein the finger-position profile describes a user's pattern of key interaction when the user is interacting with the touch screen with a particular finger position corresponding to the finger-position profile; and
   wherein the first finger position comprises one of interacting with only a right-hand thumb, interacting with only a left-hand thumb, interacting with both the right-hand thumb and the left-hand thumb, interacting with one finger, and interacting with one right-hand finger and one left-hand finger.

14. The media of claim 13, wherein the method further comprises positioning a touch-screen keyboard's key hotspots based on the finger-position profile that corresponds to the first finger position.

15. The media of claim 13, wherein the first set of contact characteristics comprise one or more of an angle of contact and a size of an area of the touch screen contacted during a keystroke.

16. The media of claim 15, wherein the contact characteristics further comprise a shape of the area of the touch screen contacted during a keystroke.

17. The media of claim 13, wherein the method further comprises:
   monitoring keystrokes for a keystroke with contact characteristics that are not consistent with the first finger position;
   repositioning a touch-screen keyboard's key hotspots to a default position; and
   determining that the user has switched to a second finger position by analyzing one or more additional keystrokes; and
   building a second finger-position profile that corresponds to the second finger position.

* * * * *